United States Patent
Balogh et al.

(10) Patent No.: US 9,936,027 B2
(45) Date of Patent: Apr. 3, 2018

(54) METHODS, SYSTEMS, AND COMPUTER READABLE MEDIA FOR APPLICATION SESSION SHARING

(71) Applicant: Ixia, Calabasas, CA (US)

(72) Inventors: Andrey John Balogh, Bothell, WA (US); Noah Gintis, Westlake Village, CA (US); Alok Kumar Srivastava, Woodland Hills, CA (US); Alexandru-Bogdan Stefan, Bucharest (RO)

(73) Assignee: KEYSIGHT TECHNOLOGIES SINGAPORE (HOLDINGS) PTE. LTD., Singapore (SG)

( * ) Notice: Subject to any disclaimer, the term of this patent is extended or adjusted under 35 U.S.C. 154(b) by 273 days.

(21) Appl. No.: 14/735,089

(22) Filed: Jun. 9, 2015

(65) Prior Publication Data

US 2016/0359983 A1 Dec. 8, 2016

(30) Foreign Application Priority Data

Jun. 8, 2015 (RO) .............................. A/00381/2015

(51) Int. Cl.
*H04L 29/08* (2006.01)
*H04L 12/26* (2006.01)

(52) U.S. Cl.
CPC .......... *H04L 67/141* (2013.01); *H04L 67/025* (2013.01); *H04L 67/2804* (2013.01); *H04L 67/34* (2013.01); *H04L 43/18* (2013.01); *H04L 43/50* (2013.01)

(58) Field of Classification Search
CPC .... H04L 67/141; H04L 67/2804; H04L 67/34
See application file for complete search history.

(56) References Cited

U.S. PATENT DOCUMENTS

| | | | |
|---|---|---|---|
| 2011/0162062 A1* | 6/2011 | Kumar | G06F 21/10 726/15 |
| 2013/0290863 A1* | 10/2013 | Chen | G06Q 10/10 715/747 |
| 2016/0063226 A1* | 3/2016 | Singh | G06F 21/30 726/3 |

* cited by examiner

*Primary Examiner* — Arvin Eskandarnia (57) ABSTRACT

Methods, systems, and computer readable media for application session sharing are disclosed. According to one method, the method includes receiving, from a first client node, a request for initiating a remote application session for interacting with an application instance by one or more users. The method also includes initiating the remote application session and configuring a remote control server for interacting with the remote application session. The method further includes providing communications between the first client node and the application instance associated with the remote application session using the remote control server.

16 Claims, 6 Drawing Sheets

METHODS, SYSTEMS, AND COMPUTER READABLE MEDIA FOR APPLICATION SESSION SHARING

PRIORITY CLAIM

This application claims the benefit of Romanian Patent Application No. a 2015 00381, filed Jun. 8, 2015; the disclosure of which is incorporated herein by reference in its entirety.

TECHNICAL FIELD

The subject matter described herein relates to network communications. More specifically, the subject matter relates to methods, systems, and computer readable media for application session sharing.

BACKGROUND

Network operators typically test network nodes for reliability and other characteristics before deploying the network nodes in live (e.g., non-test environments). Generally, it is important to test networks nodes with various amounts of traffic and different types of traffic. For example, a test platform, such as an IxNetwork™ platform manufactured by Ixia, may be usable for network topology testing and traffic analysis and may generate realistic, dynamically-controllable data-plane traffic, such as multiple packets flows, for testing various network nodes using one or more protocols.

Prior to testing network nodes, one or more applications associated with a test session may need to be configured. For example, a traffic generator application may require a user to select or configure one or more types of traffic and/or related packet flows. While users may perform separate tests using different application sessions or instances, sometimes it may be beneficial for multiple users to share a session. For example, a shared session can allow two or more users to see an application and interact with the application during configuration. Conventional techniques for application session sharing are expensive, inefficient, and/or cumbersome to setup, maintain, and/or operate.

Accordingly, a need exists for improved methods, systems, and computer readable media for application session sharing.

SUMMARY

Methods, systems, and computer readable media for application session sharing are disclosed. According to one method, the method includes receiving, from a first client node, a request for initiating a remote application session for interacting with an application instance by one or more users. The method also includes initiating the remote application session and configuring a remote control server for interacting with the remote application session. The method further includes providing communications between the first client node and the application instance associated with the remote application session using the remote control server.

According to one system, the system includes at least one processor; and a connection manager implemented using the at least one processor. The connection manager is configured to receive, from a first client node, a request for initiating a remote application session for interacting with an application instance by one or more users, to initiate the remote application session and configuring a remote control server for interacting with the remote application session, and to provide communications between the first client node and the application instance associated with the remote application session using the remote control server.

The subject matter described herein may be implemented in software in combination with hardware and/or firmware. For example, the subject matter described herein may be implemented in software executed by a processor. In some embodiments, the subject matter described herein may be implemented using a non-transitory computer readable medium having stored thereon computer executable instructions that when executed by the processor of a computer control the computer to perform steps. Various computer readable media suitable for implementing the subject matter described herein include non-transitory devices, such as disk memory devices, chip memory devices, programmable logic devices, field-programmable gate arrays, and application specific integrated circuits. In addition, a computer readable medium that implements the subject matter described herein may be located on a single device or computing platform or may be distributed across multiple devices or computing platforms.

As used herein, the term "node" refers to at least one physical computing platform including one or more processors, network interfaces, and memory.

As used herein, each of the terms "function" and "module" refer to hardware, firmware, or software in combination with hardware and/or firmware for implementing features described herein.

BRIEF DESCRIPTION OF THE DRAWINGS

The subject matter described herein will now be explained with reference to the accompanying drawings of which.

DETAILED DESCRIPTION

The subject matter described herein relates to methods, systems, and computer readable media for application session sharing. When testing network nodes, a test platform that generate network traffic and measure the network performance may require configuration from one or more users. Sometimes it may be beneficial for multiple users to share an application session, e.g., interact with a same application instance at the same time. Conventional test platforms fail to provide resource efficient and cost efficient techniques for allowing multiple users to share a same application session.

In accordance with some aspects of the subject matter described herein, techniques, methods, or mechanisms for application session sharing may utilize a remote session protocol (e.g., a remote desktop protocol (RDP)) and a remote control protocol (e.g., a virtual network computing (VNC) protocol). For example, a connection manager may initiate an RDP session for interacting with an application instance and may configure (e.g., execute, instantiate, initialize, and/or provision) a remote control server (e.g., a VNC server) associated with the RDP session. In this example, the connection manager may use a remote control client (e.g., a VNC proxy) communicatively coupled to the remote control server for sending communications (e.g., user-initiated commands and/or display information) between one or more users and/or the RDP session or the application instance, thereby allowing multiple users to interact with the same application instance.

Advantageously, in accordance with some aspects of the subject matter described herein, by using a remote control server for providing communications through to an application instance associated with a remote session, multiple users can view and control the application instance associated with the remote session. Moreover, in accordance with some aspects of the subject matter described herein, by using a remote control server, multiple users can access and share an instance of an application without requiring any modification or alteration of the application's software.

Reference will now be made in detail to various embodiments of the subject matter described herein, examples of which are illustrated in the accompanying drawings. Wherever possible, the same reference numbers will be used throughout the drawings to refer to the same or like parts.

Figure 1:
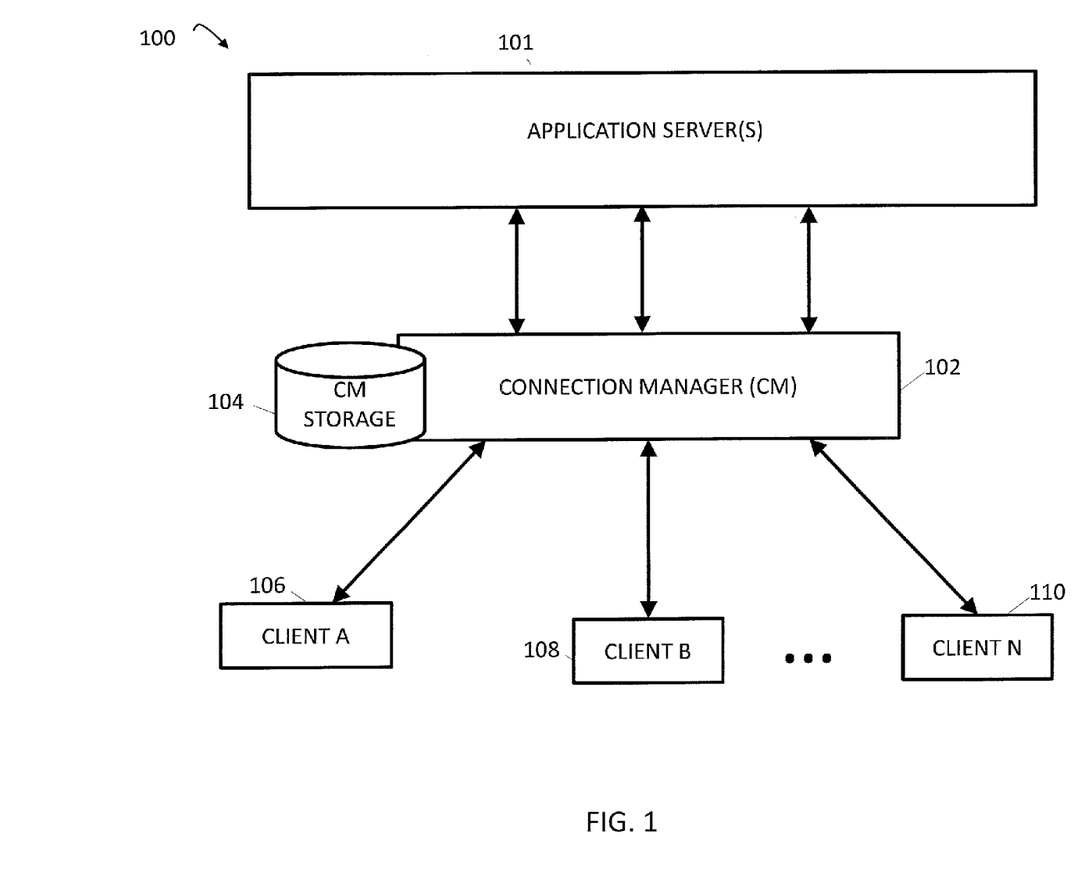
FIG. 1 is a diagram illustrating an environment for application session sharing according to an embodiment of the subject matter described herein.

FIG. 1 is a diagram illustrating an environment 100 for application session sharing according to an embodiment of the subject matter described herein. Referring to FIG. 1, environment 100 may include an application server(s) 101, a connection manager (CM) 102, and clients 106-110. Application server(s) 101 may represent any suitable entity or entities (e.g., a blade server, a network device, a node, a module, or a system of devices, nodes, and/or modules) for providing one or more applications and/or instances thereof. For example, application server(s) 101 may be an IxNetwork™ platform configured to provide a network analyzer application and/or a traffic generator application. In some embodiments, application server(s) 101 may be a single node or may include functionality distributed across multiple computing platforms or nodes.

Application server(s) 101 may include, access, or interact with CM 102. CM 102 may represent any suitable entity or entities (e.g., a computing platform, a module, software executing on a processor, etc.) for performing one or more aspects associated with application session sharing. CM 102 may be configured to establish one or more remote sessions (e.g., RDP sessions) for providing one or more application instances (e.g., instances of an IxNetwork™ application and/or other applications). For example, each remote session may be spawned or executed using the same physical hardware or on different physical hardware. CM 102 may be configured to associate a remote control server (e.g., a VNC server) with each remote application session. Each remote control server may be configured for allowing users to access or share an associated RDP session, e.g., via a VNC protocol or other protocol. For example, a VNC server may communicate with a VNC proxy at CM 102 for sharing an RDP session with clients 106-110 using VNC protocol messages or other messages. In this example, the VNC protocol messages may be routed via the VNC proxy and/or a related web server from clients 106-110 to the VNC server and vice versa.

In some embodiments, CM 102 may include functionality (e.g., one or more communications interfaces) for communicating with various nodes, modules, and/or other entities. For example, CM 102 may provide or support a web-based user interface, e.g., a graphical user interface (GUI) or an application programming interface (API), for communicating with clients 106-110. CM 102 may also include functionality for interacting with one or more remote sessions and/or related entities, such as an application executing on application server(s) 101.

In some embodiments, CM 102 and/or another entity may provide one or more user interfaces for allowing a user (e.g., clients 106-110) to initiate a new application session request and/or to request access to existing remote application sessions associated with application server(s) 101. In some embodiments, a user interface may allow for accessing a remote application session in various modes. For example, via a web-based GUI (e.g., an interactive web page), a user may select a "view only" mode for watching, but not interacting with, a remote application session or a related application instance. In another example, a user may select a "full interaction" mode for interacting (e.g., controlling and/or sending commands to) a remote application session or a related application instance.

In some embodiments, a web-based GUI for viewing or interacting with one or more remote application sessions may involve using an HTML5 compliant web server 200 and HTML5 compliant web browser applications at clients 106-110. For example, VNC protocol messages may be communicated between VNC servers and VNC clients (e.g., HTML5 web browser applications) for providing display information associated with the remote application session. By using HTML5 or similar technology for displaying video and/or display information, clients 106-110 may not need to install additional plugins or applications for viewing or interacting with remote application sessions.

In some embodiments, CM 102 and/or another entity may provide various security and/or authentication mechanisms for managing access to remote application sessions. For example, network credentials, Windows credentials, and/or domain related credentials may be used for determining whether a user is allowed to initiate and/or access a remote application session. In this example, by using these credentials and/or other authentication systems, authentication functions and/or credential maintenance may not be implemented by CM 102 and/or application server(s) 101. In another example, a federated identity (e.g., an authentication token) may be trusted by CM 102 and/or application server(s) 101 among other networks and/or resources.

In some embodiments, CM 102 and/or another entity may track and/or maintain statistics and/or events associated with remote application sessions. For example, CM 102 may provide in-session notifications associated with session sharing, e.g., by notifying current users of a session when a new user has logged in, logged off, or has changed access modes. In another example, CM 102 and/or another entity may provide one or more live thumbnails of one or more sessions via a web-based GUI. In this example, the live thumbnails may show a substantially real-time display of user interactions with one or more sessions that the user is either logged into or is authorized to view.

CM storage 104 may represent any suitable entity (e.g., a non-transitory computer readable medium, embedded memory, or a memory device) for storing data associated with application session sharing. Data stored at CM storage 104 may include application instance identifiers, application session identifiers, remote session identifiers, remote control identifiers, user information, and/or other information. In some embodiments, CM storage 104 may be accessible by CM 102 and other entities and may be usable for various purposes associated with application session sharing.

It will be appreciated that FIG. 1 is for illustrative purposes and that various nodes, their locations, and/or their functions described above in relation to FIG. 1 may be changed, altered, added, or removed. For example, some nodes and/or functions may be combined into a single entity, such as CM 102 may include functionality performed by application server(s) 101 or vice versa.

Figure 2:
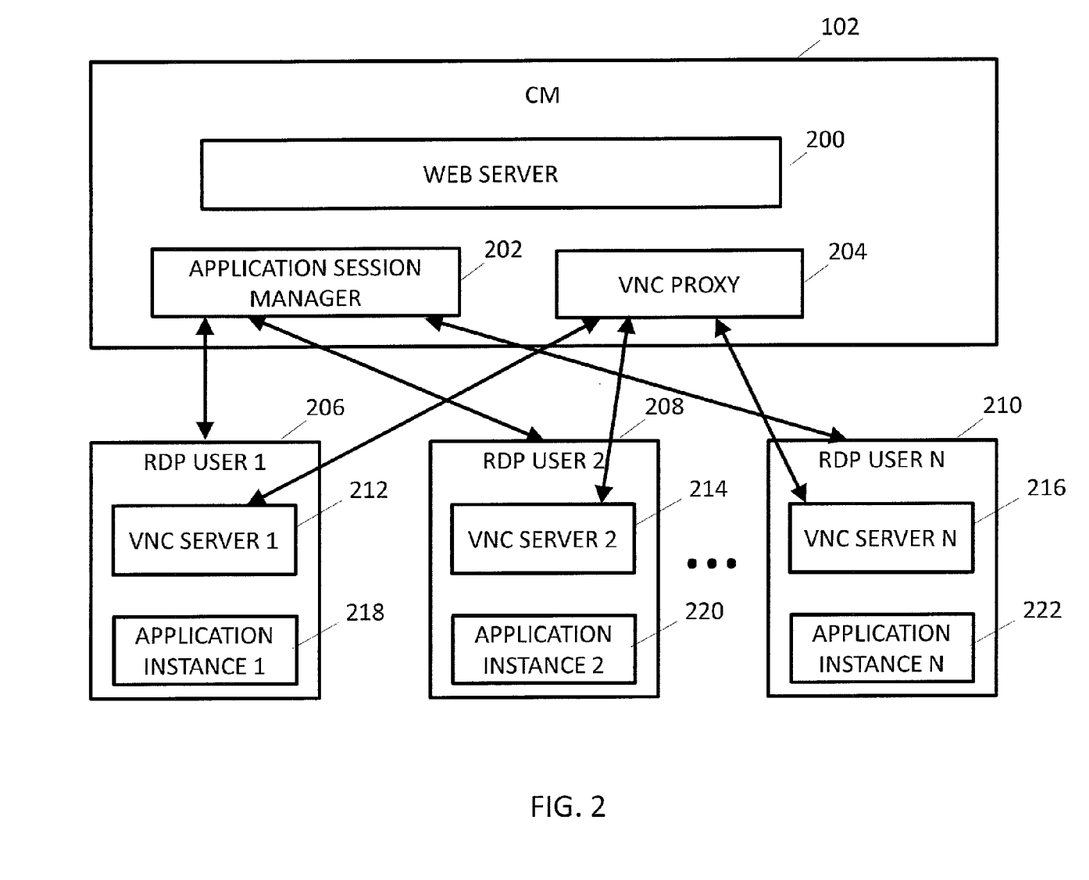
FIG. 2 is a diagram illustrating a connection manager according to an embodiment of the subject matter described herein.

FIG. 2 is a diagram illustrating CM 102 according to an embodiment of the subject matter described herein. Referring to FIG. 2, CM 102 may include a web server 200, an application session manager 202, and a VNC proxy 204. Web server 200 may represent any suitable entity or entities (e.g., a computing platform, a module, software executing on a processor, etc.) for performing one or more aspects associated with communicating with clients 106-110. For example, web server 200 may provide a web-based GUI or other interface for allowing a user (e.g., via client 106) to interact with application server(s) 101 or application instance thereon. Web server 200 may include functionality for storing, processing, and providing web pages and/or related content using hypertext transfer protocol (HTTP), hypertext markup language (HTML), HTML5, Adobe® Flash, and/or other technologies. For example, HTML5 messages may be sent to provide display information (e.g., pixel data) related to a particular remote application session.

In some embodiments, web server 200 may include a web socket server for listening on a particular socket or port and may follow or use one or more protocols. For example, web server 200 and/or a web socket server may be used in sending web pages or related content to a user agent, such as a web browser application at client 106. In this example, the user agent may send a request for a specific resource (e.g., a remote application session) and web server 200 responds with the content of that resource (e.g., via video or display information in HTML5 messages).

Application session manager 202 may represent any suitable entity or entities (e.g., a computing platform, a module, software executing on a processor, etc.) for performing one or more aspects associated with managing (e.g., creating, accessing, and/or interacting with) remote sessions (e.g., RDP sessions 206-210) and/or related application instances (e.g., application instances 212-216). For example, application session manager 202 may initiate an RDP session 216 and instantiate an application instance 218 for the RDP session. In this example, application session manager 202 may instantiate and/or configure a VNC server 212 for receiving and/or sending communications between one or more of clients 106-110 (e.g., users) and RDP session 216 and/or application instance 218.

VNC proxy 204 may represent any suitable entity or entities (e.g., a computing platform, a module, software executing on a processor, etc.) for performing one or more aspects associated with forwarding VNC protocol messages and/or related information between one or more of clients 106-110 (e.g., users) and RDP session 216 and/or application instance 218. For example, VNC proxy 204 may be configured to receive user-initiated commands from clients 106-110 via web server 200 and may forward the user-initiated commands to one or more VNC servers (e.g., VNC server 218-222), e.g., depending on which users (or clients) initiated the commands and their associated remote application session. In another example, VNC proxy 204 may be configured to receive display information from an RDP session 206 via a VNC server 212 and may forward the display information to web server 200 for delivery to one or more of clients 106-110 depending on which users (or clients) are associated with RDP session 206.

In some embodiments, communications associated with a remote application session may include a transmission control protocol (TCP) message, a user datagram protocol (UDP) message, a VNC protocol message, a remote framebuffer (RFB) protocol message, an RDP message, an Internet protocol (IP) message, an HTTP message, an HTML message, or an HTML5 message.

It will be appreciated that FIG. 2 is for illustrative purposes and that various nodes, their locations, and/or their functions described above in relation to FIG. 2 may be changed, altered, added, or removed. For example, some nodes and/or functions may be combined into a single entity.

Figure 3A:
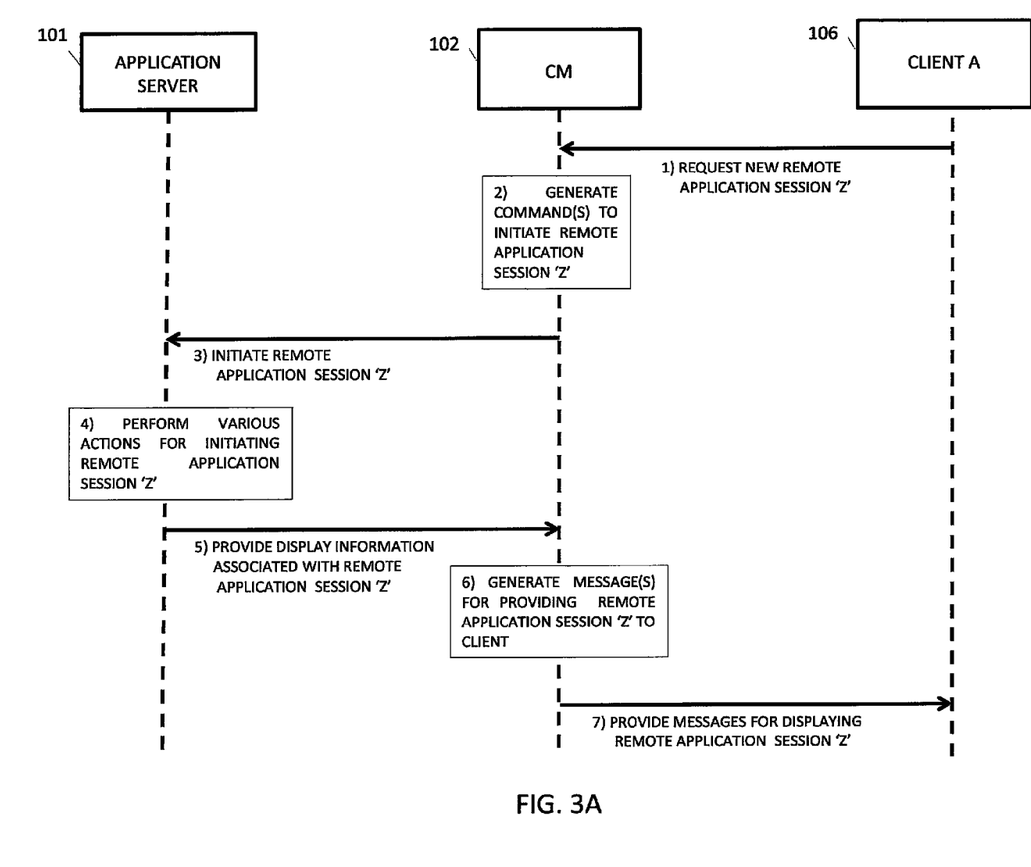
FIGS. 3A-3B are diagrams illustrating communications involving a sharable remote application session according to an embodiment of the subject matter described herein.
Figure 3B:
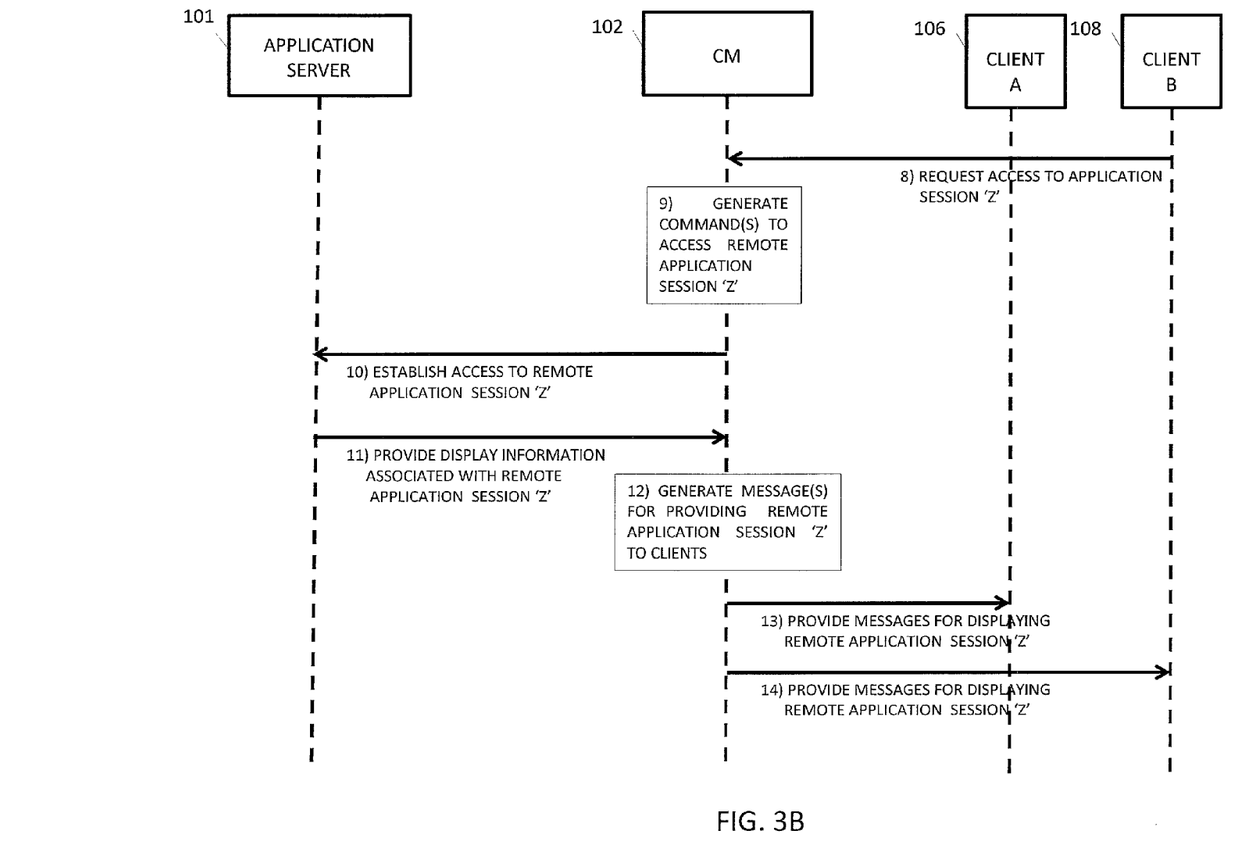

FIGS. 3A-3B are diagrams illustrating communications involving a sharable remote application session according to an embodiment of the subject matter described herein. In some embodiments, application server(s) 101 and CM 102 may each represent a separate physical entity with distinct hardware (e.g., each entity may be a distinct blade server or a computing platform). In some embodiments, application server(s) 101 and CM 102 may each represent a logical entity (e.g., software or an application) and may be implemented using the same hardware (e.g., a computing platform).

Referring to FIG. 3A, in step 1, a request for initiating a new application session 'Z' may be sent from client 106 to CM 102. For example, client 106 may include a web browser application capable of providing a GUI usable for requesting a new application session. In this example, a user may interact with the GUI to initiate or trigger the request being sent to CM 102

In step 2, CM 102 or related entities may receive the request and may generate one or more commands for initiating and/or establishing the remote application session 'Z'.

In step 3, one or more commands for initiating the remote application session 'Z' may be sent from CM 102 to application server(s) 101. For example, CM 102 may sends commands for establishing an RDP session, associating a VNC server with the RDP session, and for instantiating an application instance associated with the RDP session.

In step 4, various actions may be performed for initiating and/or establishing the remote application session 'Z'. For example, an RDP session may be established, a VNC server may be associated with the RDP session, and an application instance may be instantiated for the remote application session 'Z'.

In step 5, display information associated with the remote application session 'Z' may be provided from application server(s) 101 to CM 102. For example, after the remote application session 'Z' is established, application server(s) 101 or VNC server 212 may send display information (e.g., pixel data) via one or more VNC protocol messages.

In step 6, CM 102 may receive the display information and may generate one or more messages for providing the remote application session 'Z' to client 106. For example, CM 102 may convert and/or generate HTML5 messages that include display information that can be received and processed by a web browser application at client 106. In another example, CM 102 and/or VNC proxy 204 may generate, modify, or send VNC protocol messages from VNC server 212 to one or more clients 106-110.

In step 7, messages for displaying the remote application session 'Z' may be provided from CM 102 to client 106. For example, HTML5 messages and/or VNC protocol messages may be sent to client 106 and a web browser application or other application at client 106 may process the messages for displaying a screen or other information associated with the remote application session '7'.

Referring to FIG. 3B, in step 8, a request for accessing a new application session 'Z' may be sent from client 108 to CM 102. For example, client 108 may use a web-based GUI to request access to an existing application session 'Z'. In this example, a user may select either to access the remote application session 'Z' in one of a plurality of modes, e.g., via a "view only" mode or a "full interaction" mode.

In step 9, CM 102 or related entities may receive the request and may generate one or more commands for accessing the remote application session 'Z' as requested.

In step 10, one or more commands for accessing the remote application session 'Z' may be sent from CM 102 to application server(s) 101. For example, commands may be for enabling VNC server 212 that is associated with an RDP session 206 to communicate display information to one or more authorized users.

In step 11, display information associated with the remote application session 'Z' may be provided from application server(s) 101 to CM 102. For example, after the remote application session 'Z' is enabled for client 108, application server(s) 101 or VNC server 112 may send display information (e.g., pixel data) via one or more VNC protocol messages.

In step 12, CM 102 may receive the display information and may generate one or more messages for providing the remote application session 'Z' to client 106 and client 108.

In step 13, messages for displaying the remote application session 'Z' may be provided from CM 102 to client 106. For example, HTML5 messages and/or VNC protocol messages may be sent to client 106 and a web browser application or other application at client 106 may process the messages for displaying a screen or other information associated with the remote application session 'Z'.

In step 14, messages for displaying the remote application session 'Z' may be provided from CM 102 to client 108. For example, HTML5 messages and/or VNC protocol messages may be sent to client 108 and a web browser application or other application at client 108 may process the messages for displaying a screen or other information associated with the remote application session 'Z'.

It will be appreciated that FIG. 3 is for illustrative purposes and that different and/or additional actions may be performed when initiating and/or accessing a remote application session. It will also be appreciated that various actions described herein may occur in a different order or sequence. For example, steps 13 and 14 may occur concurrently or in a different order than depicted in FIG. 3B.

Figure 4:
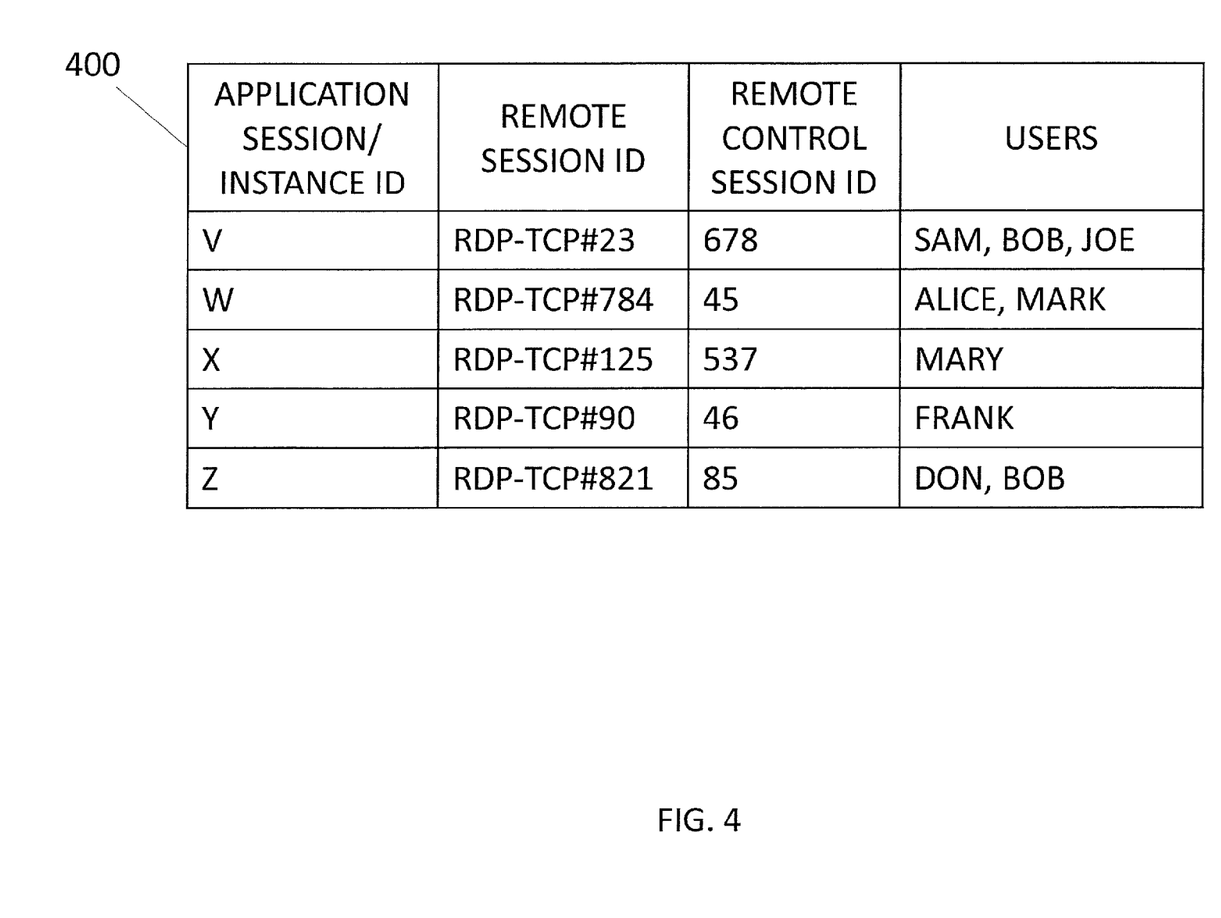
FIG. 4 is a diagram illustrating application session related data according to an embodiment of the subject matter described herein.

FIG. 4 is a diagram illustrating application session related data 400 according to an embodiment of the subject matter described herein. In some embodiments, data 400 may be obtained or derived from user input, preconfigured logic, CM 102, application server(s) 101, clients 106-110, and/or other sources. In some embodiments, data 400 may be accessible by application server(s) 101, CM 102, and/or other entities and may be stored using various data structures (e.g., in CM storage 104).

Data 400 may include any suitable information for facilitating application session sharing. For example, CM 102 and/or related entities (e.g., web server 200, application session manager 202, and/or VNC proxy 204) may use data 400 for determining where to send messages related to a particular remote application session. In this example, using data 400, CM 102 and/or related entities may forward user-initiated commands to an appropriate VNC server and/or application instance and may provide display information to relevant clients and/or users.

Referring to FIG. 4, data 400 may be depicted using a table representing associations between various session identifiers and users. For example, the table in FIG. 4 may include columns for an application session and/or instance identifier, a remote session identifier, a remote control session identifier, and users. In this example, each row in the table may indicate information about a particular remote application session and/or an application instance.

Each application session and/or instance identifier in data 400 may represent any suitable information for indicating a particular application session and/or instance. For example, an application session and/or instance identifier may include a set of characters and/or numbers that may be unique for a given time period, location, or node. In some embodiments, an application session and/or instance identifier may be usable (e.g., as a lookup value or key in a data structure) for identifying one or more related session identifiers and/or associated users.

Each remote session identifier in data 400 may represent any suitable information for indicating a particular remote session (e.g., an RDP session). For example, a remote session identifier may include a set of characters and/or numbers that may be unique for a given time period, location, or node. In some embodiments, a remote session identifier may be usable (e.g., as a lookup value or key in a data structure) for identifying one or more related session identifiers and/or associated users. In such embodiments, the remote session identifier may be used in lieu of or in addition to an application session and/or instance identifier.

Each remote control session identifier in data 400 may represent any suitable information for indicating a particular remote control session (e.g., a VNC session). For example, a remote control session identifier may include a set of characters and/or numbers that may be unique for a given time period, location, or node. In some embodiments, a remote control session identifier may be usable (e.g., as a lookup value or key in a data structure) for identifying one or more related session identifiers and/or associated users. In such embodiments, the remote control session identifier may be used in lieu of or in addition to an application session and/or instance identifier or a remote session identifier.

Each user in data 400 may represent any suitable information for indicating a particular user and/or related client node (e.g., client 106). For example, a user may include an IP address, a MAC address, a name, a private key, or a public key. In some embodiments, user information may be usable (e.g., as a lookup value or key in a data structure) for identifying one or more related session identifiers and/or associated users. In such embodiments, the user information may be used in lieu of or in addition to various session identifiers.

In some embodiments, one or more users may be associated with a particular application instance, a remote session, and/or a remote control session. For example, as indicated in data 400, three users (e.g., Sam, Bob, and Joe) may be capable of accessing (e.g., viewing and/or controlling) application instance 'V' and one user (e.g., Mary) may be capable of accessing application instance 'X'. In some embodiments, a particular user may be associated with multiple application instances, remote sessions, and/or remote control sessions. For example, as indicated in data 400, one user (e.g., Bob) may be capable of accessing application instance 'V' and application instance 'Z'.

It will be appreciated that data 400 in FIG. 4 is for illustrative purposes and that different and/or additional information may be usable for facilitating application session sharing and/or other related functionality.

Figure 5:
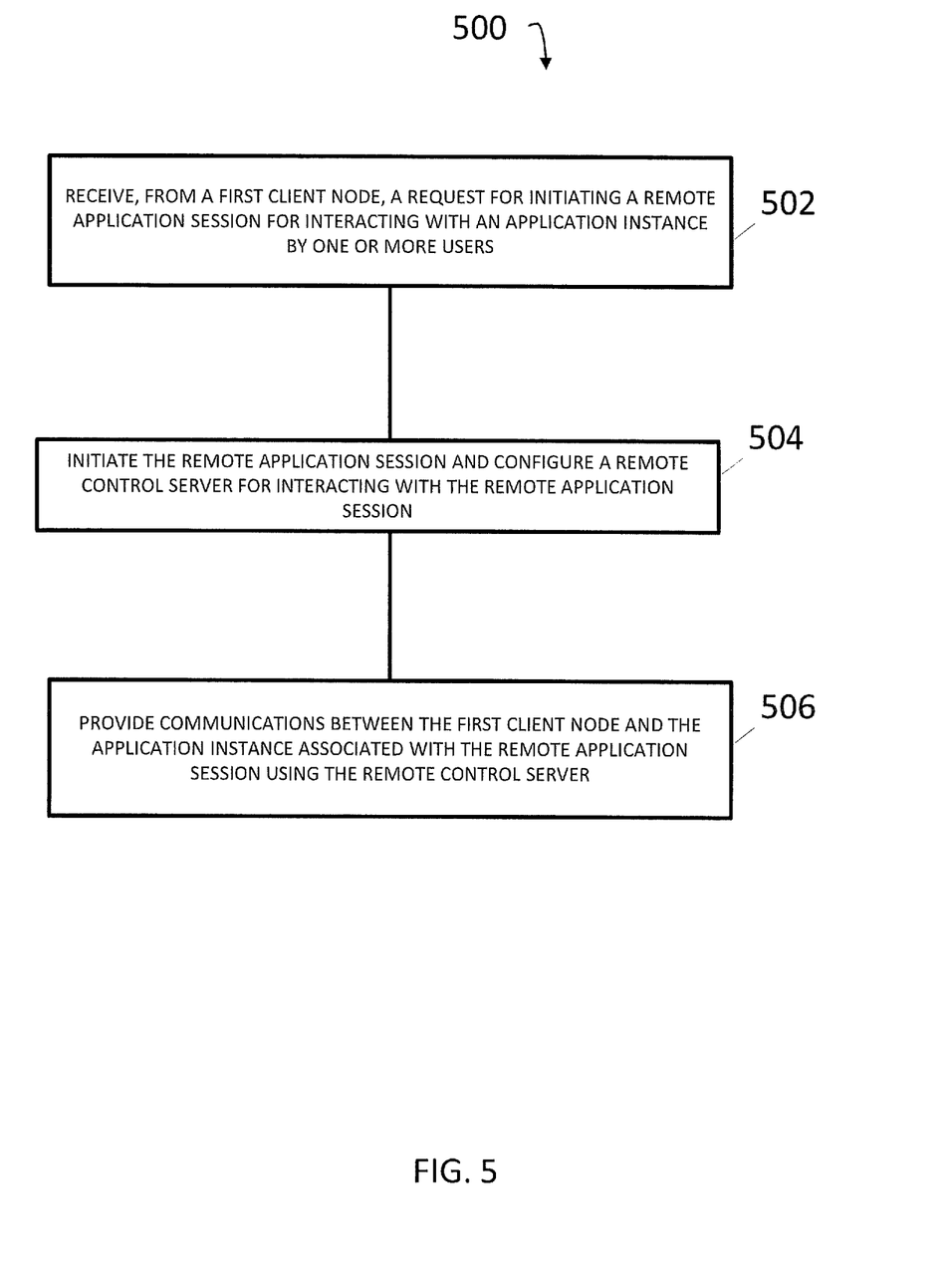
FIG. 5 is a diagram illustrating a process for sharing an application session according to an embodiment of the subject matter described herein.

FIG. 5 is a diagram illustrating a process 500 for sharing an application session according to an embodiment of the subject matter described herein. In some embodiments, process 500, or portions thereof, may be performed by or at application server(s) 101, CM 102, and/or another node or module. In some embodiments, process 500 may include steps 502, 504, and/or 506.

Referring to process 500, in step 502, a request for initiating a remote application session for interacting with an application instance may be received from a first client node (e.g., client 106). In some embodiments, the request may be for configuring a remote application session to be sharable, e.g., accessible by one or more users.

In step 504, the remote application session may be initiated and a remote control server may be configured for interacting with the remote application server. For example, after receiving a remote application session request from client 106, CM 102 may initiate and/or establish an RDP session for providing an application instance. In this example, CM 102 may also initialize and/or configure a VNC server for interacting with the RDP session.

In step 506, communications between the first client node and the application instance associated with the remote application session may be provided using the remote control server.

In some embodiments, a remote application session may a remote desktop protocol (RDP) session and the remote control server includes a virtual network computing (VNC) server.

In some embodiments, CM 102 or another entity may be configured to receive, from a second client node (e.g., client 108), a request for accessing the remote application session, and to provide communications between the second client node and the application instance associated with the remote application session using the remote control server.

In some embodiments, providing communications between a first client node and an application instance associated with a remote application session may include providing user-initiated commands (e.g., mouse and/or keyboard related input) from a remote control proxy (e.g., VNC proxy 204) or a remote control client (e.g., a web browser application or VNC client at client 106) to the remote control server and providing the user-initiated commands from the remote control server to the application instance.

In some embodiments, providing communications between a first client node and an application instance associated with a remote application session may include providing display information associated with the remote application session from the remote control server to one or more users via a remote control proxy or a remote control client.

In some embodiments, a communication associated with a remote application session may be communicated using a TCP message, a UDP message, an IP message, an HTTP message, an HTML message, a VNC message, an RFB message, an RDP message, or an HTML5 message.

In some embodiments, a communication associated with a remote application session may be sent or received using a web-based GUI.

In some embodiments, a client node (e.g., client 110) may include a web browser application for receiving display information associated with the remote application session and for sending user-initiated commands related to the remote application session.

In some embodiments, an application instance may include an instance of a traffic generation application, a network analyzer application, a test platform application, or a protocol analyzer application.

It will be appreciated that process 500 is for illustrative purposes and that different and/or additional actions may be used. It will also be appreciated that various actions described herein may occur in a different order or sequence.

It should be noted that application server(s) 101, CM 102, and/or functionality described herein may constitute a special purpose computing device. Further, application server(s) 101, CM 102, and/or functionality described herein can improve the technological field of test configuration and general computing productivity by providing mechanisms for efficiently allowing one or more users to concurrently access (e.g., watch and/or interact with) an application instance, e.g., with requiring modification to the application instance.

The subject matter described herein for application session sharing improves the functionality of test platforms and/or application servers by providing mechanisms for allowing multiple users to access an application instance. It should also be noted that a computing platform that implements subject matter described herein may comprise a special purpose computing device (e.g., a test platform, an application server, or module therein) usable for application session sharing.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for application session sharing, the method comprising:
   receiving, from a first client node, a request for initiating a remote application session for interacting with an application instance by one or more users;
   configuring, at a connection manager, a remote control proxy server for sending messages between one or more client nodes and the remote application session;
   initiating the remote application session and configuring a remote control server at the first client node for interacting with the remote application session;
   receiving, from a second client node, a request for accessing the remote application session; and
   providing communications between the second client node and the application instance associated with the remote application session using the remote control server, wherein providing the communications between the second client node and the application instance associated with the remote application session includes providing, via the remote control proxy server, user-initiated commands from the second client node to the remote control server and providing the user-initiated commands from the remote control server to the application.

2. The method of claim 1 wherein the remote application session includes a remote desktop protocol (RDP) session and the remote control server includes a virtual network computing (VNC) server.

3. The method of claim 1 wherein providing the communications between the second client node and the application instance associated with the remote application session includes providing display information associated with the remote application session from the remote control server to the one or more users via the remote control proxy server.

4. The method of claim 3 wherein at least one of the communications is communicated using a transmission control protocol (TCP) message, a user datagram protocol (UDP) message, an Internet protocol (IP) message, a virtual network computing (VNC) protocol message, a remote framebuffer (RFB) protocol message, a remote desktop protocol (RDP) message, a hypertext transfer protocol (HTTP) message, a hypertext markup language (HTML) message, or an HTML5 message.

5. The method of claim 1 wherein at least one of the communications is sent or received using a web-based graphical user interface (GUI).

6. The method of claim 1 wherein the first client node includes a web browser application for receiving display information associated with the remote application session and for sending user-initiated commands related to the remote application session.

7. The method of claim 1 wherein the application instance includes an instance of a traffic generation application, a network analyzer application, a test platform application, or a protocol analyzer application.

8. A system for application session sharing, the system comprising:
at least one processor; and
a connection manager implemented using the at least one processor, the connection manager configured to:
receive, from a first client node, a request for initiating a remote application session for interacting with an application instance by one or more users;
configure, at the connection manager, a remote control proxy server for sending messages between one or more client nodes and the remote application session;
initiate the remote application session and configuring a remote control server at the first client node for interacting with the remote application session;
receive, from a second client node, a request for accessing the remote application session; and
provide communications between the second client node and the application instance associated with the remote application session using the remote control server, wherein providing the communications between the second client node and the application instance associated with the remote application session includes providing, via the remote control proxy server, user-initiated commands from the second client node to the remote control server and providing the user-initiated commands from the remote control server to the application.

9. The system of claim 8 wherein the remote application session includes a remote desktop protocol (RDP) session and the remote control server includes a virtual network computing (VNC) server.

10. The system of claim 8 wherein the remote control server is configured to provide display information associated with the remote application session to the one or more users via the remote control proxy server.

11. The system of claim 10 wherein at least one of the communications is communicated using a transmission control protocol (TCP) message, a user datagram protocol (UDP) message, a virtual network computing (VNC) protocol message, a remote framebuffer (RFB) protocol message, a remote desktop protocol (RDP) message, an Internet protocol (IP) message, a hypertext transfer protocol (HTTP) message, a hypertext markup language (HTML) message, or an HTML5 message.

12. The system of claim 8 wherein at least one of the communications is sent or received using a web-based graphical user interface (GUI).

13. The system of claim 8 wherein the first client node includes a web browser application for receiving display information associated with the remote application session and for sending user-initiated commands related to the remote application session.

14. The system of claim 8 wherein the application instance includes an instance of a traffic generation application, a network analyzer application, a test platform application, or a protocol analyzer application.

15. A non-transitory computer readable medium having stored thereon executable instructions that when executed by a processor of a computer cause the computer to perform steps comprising:
receiving, from a first client node, a request for initiating a remote application session for interacting with an application instance by one or more users;
configuring, at a connection manager, a remote control proxy server for sending messages between one or more client nodes and the remote application session;
initiating the remote application session and configuring a remote control server at the first client node for interacting with the remote application session;
receiving, from a second client node, a request for accessing the remote application session; and
providing communications between the second client node and the application instance associated with the remote application session using the remote control server, wherein providing the communications between the second client node and the application instance associated with the remote application session includes providing, via the remote control proxy server, user-initiated commands from the second client node to the remote control server and providing the user-initiated commands from the remote control server to the application.

16. The non-transitory computer readable medium of claim 15 wherein the remote application session includes a remote desktop protocol (RDP) session and the remote control server includes a virtual network computing (VNC) server.

* * * * *